United States Patent

(12) United States Patent
Fujii et al.

(10) Patent No.: US 9,762,156 B2
(45) Date of Patent: Sep. 12, 2017

(54) CONTROL APPARATUS FOR ROTATING ELECTRIC MACHINE

(71) Applicant: DENSO CORPORATION, Kariya, Aichi-pref. (JP)

(72) Inventors: Kiyoshi Fujii, Kariya (JP); Ryosuke Utaka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/331,138

(22) Filed: Oct. 21, 2016

(65) Prior Publication Data

US 2017/0117834 A1 Apr. 27, 2017

(30) Foreign Application Priority Data

Oct. 21, 2015 (JP) ................................ 2015-207176
Jul. 22, 2016 (JP) ................................ 2016-144917

(51) Int. Cl.
| | |
|---|---|
| H02P 25/00 | (2006.01) |
| H02P 6/18 | (2016.01) |
| H02P 21/24 | (2016.01) |
| H02K 21/12 | (2006.01) |
| H02P 27/06 | (2006.01) |

(52) U.S. Cl.
CPC .............. H02P 6/18 (2013.01); H02K 21/12 (2013.01); H02P 21/24 (2016.02); H02P 27/06 (2013.01)

(58) Field of Classification Search
CPC . H02P 6/18; H02P 27/06; H02P 21/24; H02K 21/12
USPC .................................................... 318/400.41
See application file for complete search history.

(56) References Cited

U.S. PATENT DOCUMENTS

| 4,495,450 A * | 1/1985 | Tokizaki | ................ | H02K 29/12 |
| | | | | 318/400.1 |
| 4,641,066 A * | 2/1987 | Nagata | .................... | H02P 6/187 |
| | | | | 318/400.11 |
| 2002/0105300 A1* | 8/2002 | Moriya | ...................... | H02P 6/08 |
| | | | | 318/727 |
| 2006/0022623 A1* | 2/2006 | Inaba | ...................... | H02P 6/185 |
| | | | | 318/400.02 |
| 2010/0320945 A1* | 12/2010 | Taniguchi | ............... | H02P 23/08 |
| | | | | 318/400.02 |

(Continued)

FOREIGN PATENT DOCUMENTS

JP 3424307 B2 7/2003

*Primary Examiner* — Bentsu Ro
*Assistant Examiner* — Gabriel Agared
(74) *Attorney, Agent, or Firm* — Oliff PLC

(57) ABSTRACT

A rotating electric machine is applied to a multilayer winding-type rotating electric machine including a stator and a rotor. The stator includes an armature winding. The rotor includes at least one of a field winding and a permanent magnet for generating a magnetic field that have characteristics of magnetic flux of a non-sinusoidal waveform in relation to a rotation angle of the rotor. The armature winding has winding groups. Each of the winding groups has coils that are connected to an actual neutral point provided for each winding group, and has a first winding group and a second winding group that have a phase difference. A control apparatus detects a rotation angle based on a voltage at the actual neutral point of the first winding group and a voltage at the actual neutral point of the second winding group, and controls the rotating electric machine based on the rotation angle.

17 Claims, 10 Drawing Sheets

(56) References Cited

U.S. PATENT DOCUMENTS

2012/0181959 A1* 7/2012 Otokawa ................. H02P 6/182
318/400.13
2012/0286705 A1* 11/2012 Tanaka .................... H02P 27/08
318/139

* cited by examiner

ELECTRICAL ANGLE

CONTROL APPARATUS FOR ROTATING ELECTRIC MACHINE

CROSS-REFERENCE TO RELATED APPLICATION

This application is based on and claims the benefit of priority from Japanese Patent Application Nos. 2015-207176, filed Oct. 21, 2015 and 2016-144917, filed Jul. 22, 2016. The entire disclosures of the above applications are incorporated herein by reference.

BACKGROUND

Technical Field

The present disclosure relates to a control apparatus for a rotating electric machine that controls a synchronous rotating electric machine. In particular, the present disclosure relates to detection of a rotation angle of a rotor.

Related Art

A control apparatus for a synchronous rotating electric machine, such as a brushless direct-current (DC) motor, controls the rotating electric machine by manipulating a voltage supplied to the rotating electric machine based on a rotation angle of a rotor. A configuration of the control apparatus of a synchronous rotating electric machine is known in which the rotation angle of the rotor is detected based on periodic changes in voltage at a neutral point of an armature winding. For example, in a configuration described in Japanese Patent Publication No. 3424307, a resistor circuit that has a three-phase star connection is provided in parallel with an armature winding that has a three-phase star connection. An induced voltage generated in the armature winding is acquired based on a deviation between the voltage at the neutral point of the armature winding and the voltage at the neutral point of the resistor circuit. The rotation angle of the rotor is then detected based on the detected induced voltage.

Double-layer winding-type rotating electric machines have been used in recent years. In double-layer winding-type rotating electric machines, three-phase windings are doubly disposed with a phase difference of 30 degrees so as to cancel out sixth-order components of a reaction magnetomotive force that is a main cause of magnetic noise in a rotating electric machine for vehicles. A proposal for a new technique for this type of multilayer winding-type rotating electric machines is desired to be applicable to a configuration in which a rotation angle of a rotor is detected based on period changes in voltage at a neutral point of an armature winding.

SUMMARY

It is thus desired to provide a new technique for a multilayer winding-type rotating electric machine that is applicable to a configuration in which a rotation angle of a rotor is detected based on periodic changes in voltage at a neutral point of an armature.

An exemplary embodiment provides a control apparatus that is applied to a multilayer winding-type rotating electric machine including: a stator that includes an armature winding; and a rotor that includes at least one of a field winding and a permanent magnet for generating a magnetic field. The armature winding has a plurality of winding groups. Each of the winding groups has a plurality of coils that are connected to an actual neutral point provided for each winding group. The at least one of the field winding and the permanent magnet have characteristics of magnetic flux of a non-sinusoidal waveform in relation to the rotation angle of the rotor. The control apparatus controls the rotating electric machine based on the rotation angle. Each of the plurality of winding groups has a first winding group and a second winding group that have a phase difference. The control apparatus includes a rotation angle detecting means for detecting the rotation angle based on a voltage at the actual neutral point of the first winding group and a voltage at the actual neutral point of the second winding group.

In the rotating electric machine that has a plurality of winding groups as an armature winding, the rotation angle of the rotating electric machine is detected based on the voltage at the actual neutral point of the first winding group and the voltage at the actual neutral point of the second winding group. Specifically, a voltage that corresponds to the difference between the average value of the voltages applied to the plurality of coils configuring the winding group and the average value of induced voltages generated in the plurality of coils configuring the winding group is applied to the actual neutral point. Because the induced voltage changes depending on the rotation angle of the rotor, the rotation angle of the rotor can be calculated based on the voltage at the actual neutral point. Furthermore, in the present configuration, angle detection is performed using two actual neutral points that differ from each other. As a result, effects such as improving the accuracy of angle detection and increasing opportunities for angle detection during a single rotation cycle of the rotating electric machine can be achieved.

DESCRIPTION OF THE EMBODIMENTS

First Embodiment

A first embodiment in which a control apparatus of the present disclosure is applied to a vehicle will hereinafter be described with reference to the drawings. The vehicle includes an engine as a main on-board engine.

Figure 1:
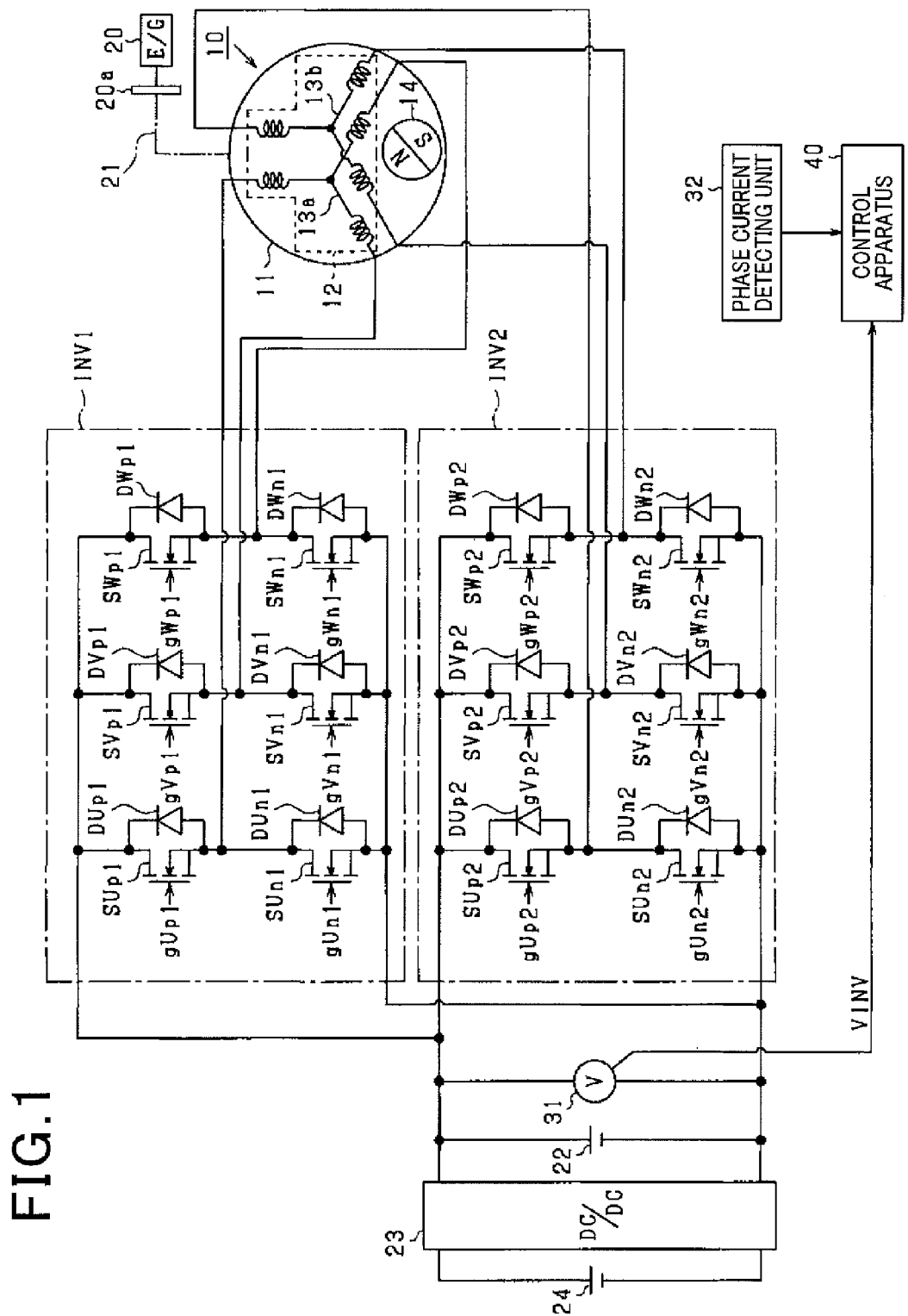
FIG. 1 is a diagram of an electrical configuration according to a first embodiment.

As shown in FIG. 1, a motor 10 is a rotating electric machine that has a multiple-phase, multiple-layer winding. Specifically, the motor 10 of the present embodiment is a synchronous motor that has a three-phase, double-layer winding. According to the present embodiment, the motor 10 is assumed to be an integrated starter generator (ISG) in which the functions of a starter and an alternator (power generator) are integrated. In particular, according to the present embodiment, the motor 10 functions as the starter, not only for the initial startup of an engine 20, but also when an idling stop function is performed. In the idling stop function, the engine 20 is automatically stopped when a predetermined automatic stop condition is met, and the engine 20 is subsequently automatically restarted when a predetermined restart condition is met.

A rotor 11 that configures the motor 10 includes a permanent magnet 14 for generating a magnetic field. In addition, power transmission can be performed between the rotor 11 and a crank shaft 20a of the engine 20. According to the present embodiment, the rotor 11 is connected (more specifically, directly connected) to the crank shaft 20a by a belt 21.

The permanent magnet 14 for generating a magnetic field that is provided in the rotor 11 has characteristics of magnetic flux of a non-sinusoidal waveform in relation to a rotation angle of zero degrees of the rotor 11. Specifically, the permanent magnet 14 is magnetized by a trapezoidal-wave magnetization. In addition, the permanent magnet 14 is provided on the surface of the rotor 11. The motor 10 is a surface permanent magnet synchronous motor (SPMSM). To simplify the description, the permanent magnet 14 for generating a magnetic field is indicated as having two poles. However, the number of poles may be modified such that the permanent magnet 14 has four or six poles.

Two armature-winding groups (hereafter, a first winding group 13a and a second winding group 13b) are wound around a stator 12 of the motor 10. The first winding group 13a and the second winding group 13b configure an armature winding. The first winding group 13a and the second winding group 13b have a phase difference of 30 degrees. The rotor 11 is shared between the first winding group 13a and the second winding group 13b. The first winding group 13a and the second winding group 13b are each composed of three-phase windings and have differing neutral points. According to the present embodiment, a number of turns T1 of each of the windings configuring the first winding group 13a and a number of turns T2 of each of the windings configuring the second winding group 13b are set to be equal.

Two inverters (hereafter, a first inverter INV1 and a second inverter INV2) are electrically connected to the motor 10. The first inverter INV1 and the second inverter INV2 respectively correspond to the first winding group 13a and the second winding group 13b. Specifically, the first inverter INV1 is connected to the first winding group 13a. The second inverter INV2 is connected to the second winding group 13b. A high voltage battery 22 is connected in parallel to both the first inverter INV1 and the second inverter INV2. The high voltage battery 22 serves as a common direct-current power supply An output voltage of a low voltage battery 24 that has been boosted by a DC-to-DC boost converter 23 can be applied to the high voltage battery 22. The output voltage of the low voltage battery 24 (such as a lead storage battery) is set to be lower than the output voltage of the high voltage battery 22 (such as a lithium ion storage battery).

The first inverter INV1 has three sets of series-connection bodies composed of first U-, V-, and W-phase, high-voltage side switches SUp1, SVp1, and SWp1, and first U-, V-, and W-phase, low-voltage side switches SUn1, SVn1, and SWn1. Connection points of the U-, V-, and W-phase series-connection bodies are respectively connected to U-, V-, and W-phase terminals of the first winding group 13a. According to the present embodiment, N-channel metal-oxide-semiconductor field-effect transistors (MOSFETs) are used as the switches SUp1 to SWn1. Diodes DUp1 to DWn1 are respectively connected in inverse parallel to the switches SUp1 to SWn1. The diodes DUp1 to DWn1 may be body diodes of the switches SUp1 to SWn1. In addition, the switches SUp1 to SWn1 are not limited to N-channel MOSFETs and may be, for example, insulated-gate bipolar transistors (IGBTs).

In a manner similar to the first inverter INV1, the second inverter INV2 has three sets of series-connection bodies composed of second U-, V-, and W-phase, high-voltage side switches SUp2, SVp2, and SWp2, and second U-, V-, and W-phase, low-voltage side switches SUn2, SVn2, and SWn2. Connection points of the U-, V-, and W-phase series-connection bodies are respectively connected to U-, V-, and W-phase terminals of the second winding group 13b. According to the present embodiment, N-channel MOSFETs are used as the switches SUp2 to SWn2. Diodes Dup2 to DWn2 are respectively connected in inverse parallel to the switches SUp2 to SWn2. The diodes Dup2 to DWn2 may be body diodes of the switches SUp2 to SWn2. In addition, the switches SUp2 to SWn2 are not limited to the N-channel MOSFETs and may be, for example, IGBTs.

A positive electrode terminal of the high voltage battery 22 is connected to the high-voltage side terminals of the inverters INV1 and INV2 (drain-side terminals of the high-voltage side switches). A negative electrode terminal of the high voltage battery 22 is connected to the low-voltage side terminals (source-side terminals of the low-voltage side switches).

A control system according to the present embodiment includes a voltage sensor 31 and a phase current detecting unit 32. The voltage sensor 31 detects power supply voltages of the inverters INV1 and INV2. The phase current detecting unit 32 detects each phase current of the first winding group 13a (current flowing through the first winding group 13a on a fixed coordinate system) and each phase current of the second winding group 13b. In addition, for example, a component that includes a current transformer or a resistor may be used as the phase current detecting unit 33.

Detection values of the various sensors, described above, are supplied to a control apparatus 40. The control apparatus

40 includes a central processing unit (CPU) and a memory. The control unit 40 corresponds to software processing means in which programs stored in the memory are run by the CPU. The control apparatus 40 generates and outputs operating signals for operating the first inverter INV1 and the second inverter INV2, based on the detection values of the various sensors, to control a controlled variable of the motor 10 to a command value. Here, the controlled variable of the motor 10 during power running is an output torque T outputted to the crank shaft 20$a$. The command value is a torque command value T*.

Furthermore, the control apparatus 40 according to the present embodiment working as rotation angle detecting means acquires a rotation angle θ of the rotor 11 based on a voltage at the neutral point of the first winding group 13$a$ and a voltage at the neutral point of the second winding group 13$b$. The control apparatus 40 then performs vector control of the motor 10 based on the rotation angle θ, in addition to the detection values of the voltage sensor 31 and the phase current detecting unit 32.

Figure 2:
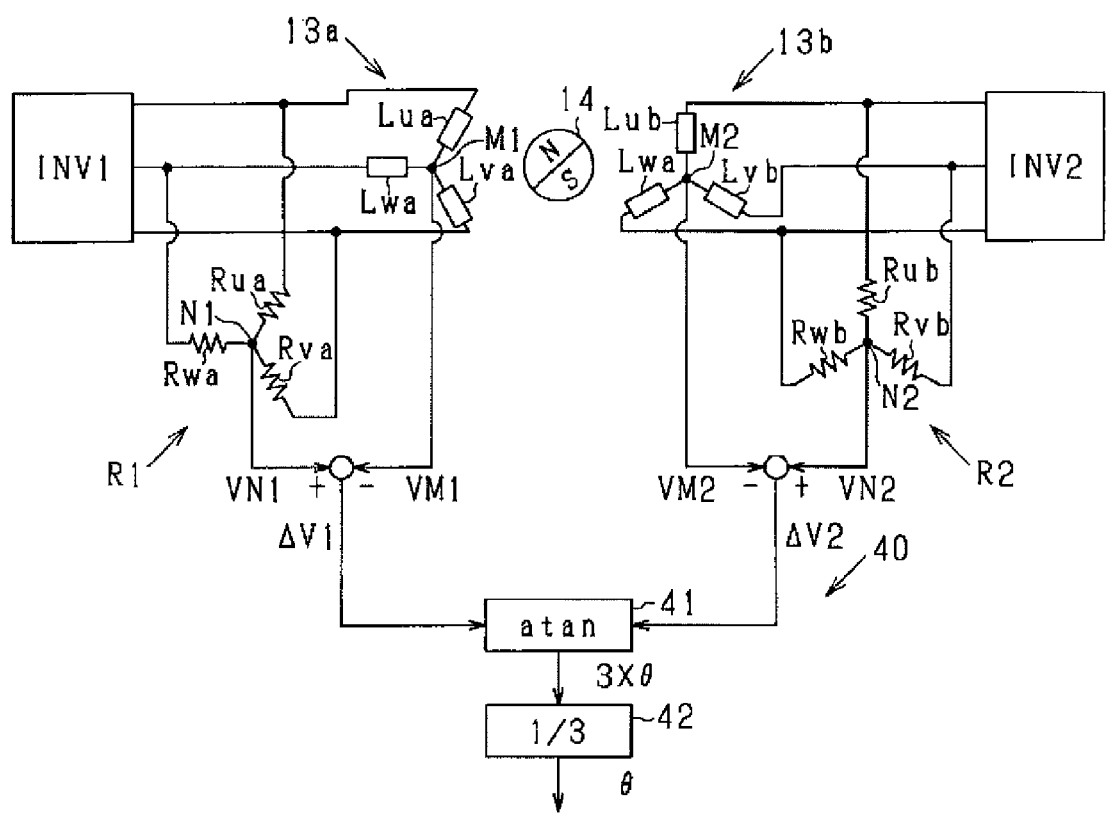
FIG. 2 is a schematic diagram of a method for acquiring a rotation angle according to the first embodiment.

FIG. 2 shows a model diagram of a method by which the control apparatus 40 acquires the rotation angle θ.

The first winding group 13$a$ is configured such that coils Lua, Lva, and Lwa are connected by a three-phase star connection, at a neutral point M1 (actual neutral point). In addition, the second winding group 13$b$ is configured such that coils Lub, Lvb, and Lwb are connected by a three-phase star connection, at a neutral point M2 (actual neutral point). The actual neutral point M1 of the first winding group 13$a$ and the actual neutral point M2 of the second winding group 13$b$ are mutually insulated.

According to the present embodiment, a first resistor circuit R1 is provided between the first winding group 13$a$ and the first inverter INV1. A second resistor circuit R2 is provided between the second winding group 13$b$ and the second inverter INV2. The resistor circuit R1 includes a first virtual neutral point N1 and a plurality of resistors Rua, Rva, and Rwa that are connected to the first virtual neutral point N1. The resistor circuit R1 is connected in parallel to the first winding group 13$a$. More specifically, the resistors Rua, Rva, and Rwa are connected by a three-phase star connection.

In a similar manner, the resistor circuit R2 includes a second virtual neutral point N2 and a plurality of resistors Rub, Rvb, and Rwb that are connected to the second virtual neutral point N2. The resistor circuit R2 is connected in parallel to the second winding group 13$b$. More specifically, the resistors Rub, Rvb, and Rwb are connected by a three-phase star connection.

Here, respective terminal voltages of the U-phase terminal, the V-phase terminal, and the W-phase terminal of the first winding group 13$a$ connected to the inverter INV1 are VU1, VV1, and VW1. Respective induced voltages of the U-phase coil, the V-phase coil, and the W-phase coil of the first winding group 13$a$ are EU1, EV1, and EW1. A voltage at the actual neutral point M1 of the first winding group 13$a$ is VM1. A voltage at the virtual neutral point N1 of the first resistor circuit R1 is VN1. In this case, the neutral point voltages VM1 and VN1 are respectively expressed by VM1=(⅓)(VU1−EU1+VV1−EV1+VW1−EW1) and VN1=(⅓)(VU1+VV1+VW1). That is, a voltage difference ΔV1 (first voltage difference) between the neutral point voltages VN1 and VM1 is expressed by ΔV1=VN1−VM1=(⅓)(EU1+EV1+EW1).

In a similar manner, respective terminal voltages of the U-phase terminal, the V-phase terminal, and the W-phase terminal of the second winding group 13$b$ connected to the inverter INV2 are VU2, VV2, and VW2. Respective induced voltages of the U-phase coil, the V-phase coil, and the W-phase coil of the second winding group 13$b$ are EU2, EV2, and EW2. A voltage at the actual neutral point M2 of the second winding group 13$b$ is VM2. A voltage at the virtual neutral point N2 of the second resistor circuit R2 is VN2. In this case, the neutral point voltages VM2 and VN2 are respectively expressed by VM2=(⅓)(VU2−EU2+VV2−EV2+VW2−EW2) and VN2=(⅓)(VU2+VV2+VW2). That is, a voltage difference ΔV2 (second voltage difference) between the neutral point voltages VN2 and VM2 is expressed by ΔV2=VN2−VM2=(⅓)(EU2+EV2+EW2).

Figure 3:
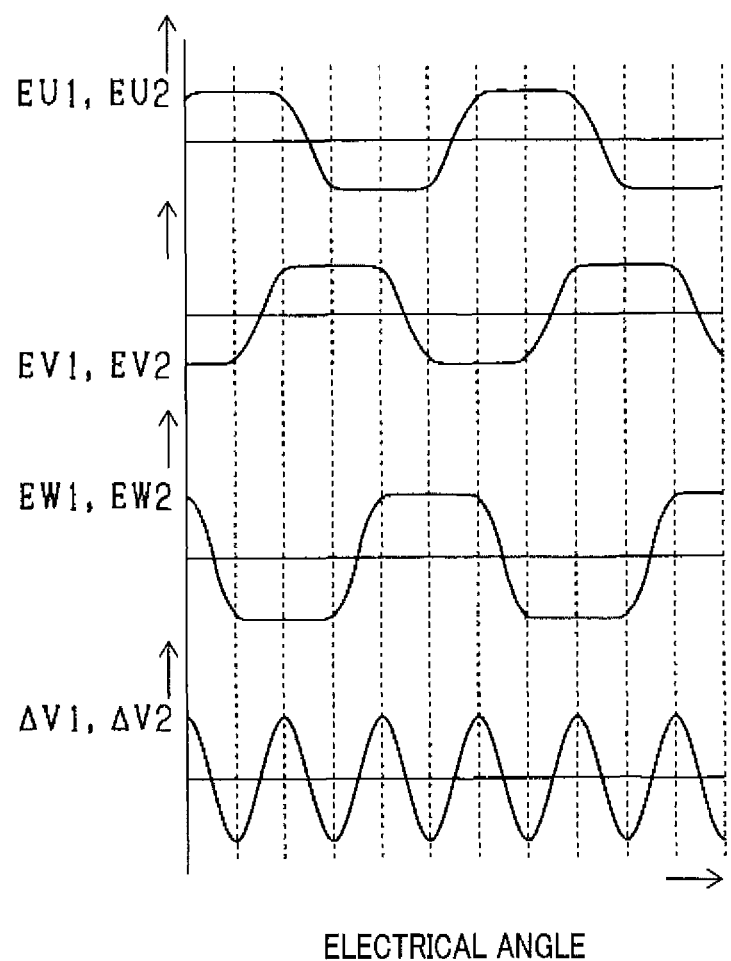
FIG. 3 is a diagram of induced voltages and voltage differences between actual neutral point voltages and virtual neutral point voltages.

The first winding group 13$a$ and the second winding group 13$b$ have a phase difference of 30 degrees. Consequently, sixth-order component (and 6n-th order component, where n is a natural number of 2 or greater) of the induced voltages EU1, EV1, and EW1 generated in the first winding group 13$a$ and sixth-order component (and 6n-th order component, where n is a natural number of 2 or greater) of the induced voltages EU2, EV2, and EW2 generated in the second winding group 13$b$ are mutually canceled out. Therefore, third-order component of the induced voltages EU1, EV1, EW1, EU2, EV2, and EW2 are mainly outputted as the voltage differences ΔV1 and ΔV2. As shown in FIG. 3, the voltage differences ΔV1 and ΔV2 are substantially sine waves having three times the frequency of the induced voltages EU1, EV1, EW1, EU2, EV2, and EW2 that have substantially trapezoidal waveforms.

Figure 4:
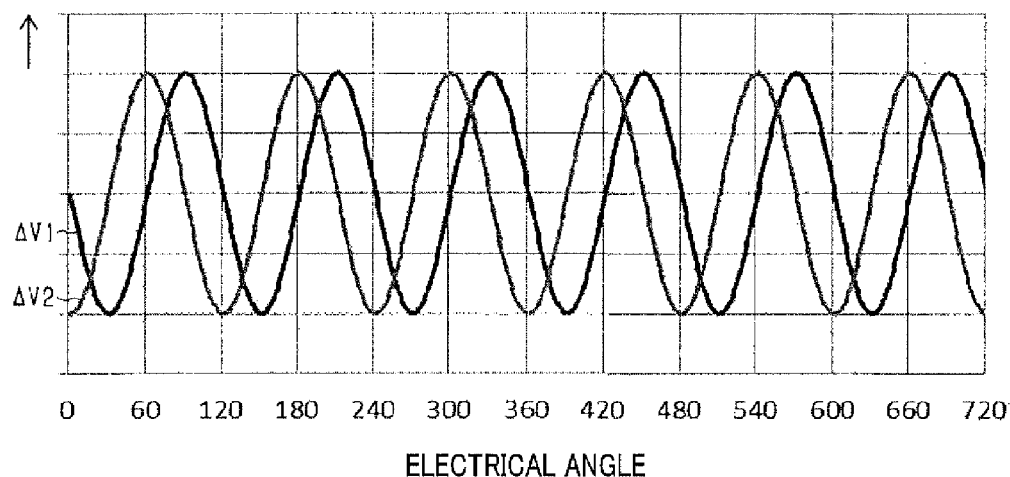
FIG. 4 is a diagram of voltage differences $\Delta V1$ and $\Delta V2$ between the actual neutral point voltages and the virtual neutral point voltages, in a first winding group and a second winding group.

Here, the induced voltages EU1, EV1, and EW1 of the first winding group 13$a$ and the induced voltages EU2, EV2, and EW2 of the second winding group 13$b$ have a phase difference equivalent to that between the first winding group 13$a$ and the second winding group 13$b$, that is, a phase difference of 30 degrees (electrical angle). The phase differences ΔV1 and ΔV2 each have a frequency that is three times that of a fundamental wave. Therefore, as shown in FIG. 4, the phase difference between the voltage difference ΔV1 and the voltage difference ΔV2 is 90 degrees.

Figure 5:
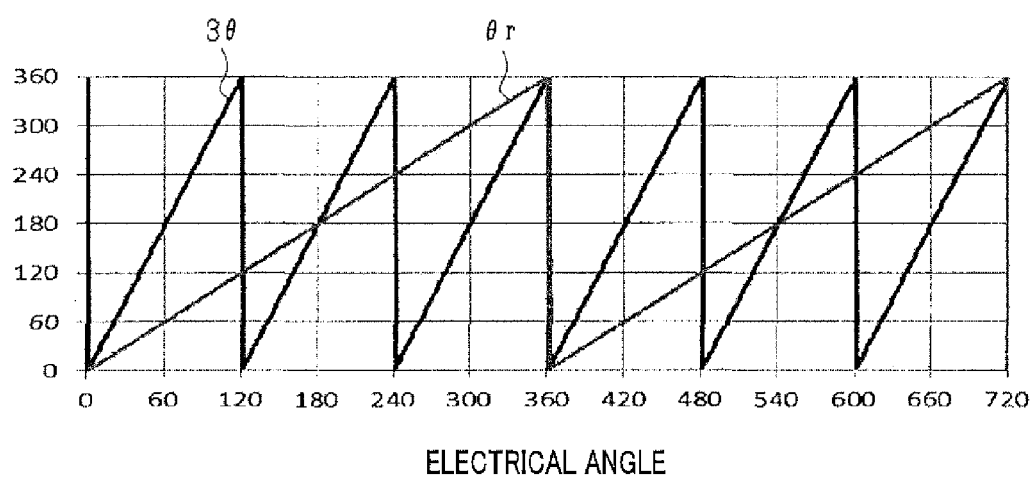
FIG. 5 is a diagram of a correspondence between actual values and detected values of the rotation angle according to the first embodiment.

That is, when the voltage difference ΔV1 is expressed as ΔV1=Amp×sin 3θ, the voltage difference ΔV2 can be expressed as ΔV2=Amp×sin 3 (θ+30°)=Amp×sin (3θ+90°)=Amp×cos 3θ. Here, Amp denotes an amplitude of the voltage differences ΔV1 and ΔV2. That is, a ratio ΔV1/ΔV2 of the voltage difference ΔV1 and the voltage difference ΔV1 is ΔV1/ΔV2=sin 3θ/cos 3θ=tan 3θ. That is, as a result of an arctangent of the ratio ΔV1/ΔV2 of the voltage differences being calculated, 3θ can be obtained as a continuous value. FIG. 5 shows an angle 3θ calculated based on the ratio ΔV1/ΔV2 of the voltage differences and an actual value (true value) Or of the rotation angle θ.

The control apparatus 40 that serves as a rotation angle acquiring means according to the present embodiment includes an arctangent calculating unit 41 (FIG. 2). The arctangent calculating unit 41 is a means for calculating the arctangent of the ratio ΔV1/ΔV2 of the voltage differences. The arctangent calculating unit 41 calculates the ratio ΔV1/ΔV2 of the voltage differences, and then calculates the rotation angle θ by calculating the arctangent of the calculated ratio (i.e., a tan(ΔV1/ΔV2)=3θ). Furthermore, according to the present embodiment, a dividing unit 42 of the control apparatus 40 acquires the rotation angle θ by multiplying the arctangent of the ratio ΔV1/ΔV2 (i.e., a tan (ΔV1/ΔV2)) of the voltage differences by ⅓.

Ground voltages of the inverters INV1 and INV2, and the motor 10 differ from a ground voltage of the control apparatus 40. Here, the actual neutral point voltages VM1 and VM2 and the virtual neutral point voltages VN1 and VN2 are inputted to the control apparatus 40 through a differential amplification circuit (not shown). As a result of the differential amplification circuit and the control apparatus 40 having a common ground voltage, the control apparatus 40 acquires the voltage differences ΔV1 and ΔV2.

Effects according to the present embodiment will be described below.

In a configuration in which the armature winding is composed of three-phase windings, the third-order component of an induced voltage having a sine waveform is generated in the armature winding. Here, the respective differences ΔV1 and ΔV2 between the voltages VN1 and VN2 at the virtual neutral points N1 and N2 (neutral points of the resistor circuits) in which the third-order component of the induced voltage is not generated and the voltages VM1 and VM2 at the actual neutral points M1 and M2 of the winding groups 13a and 13b are detected. The rotation angle θ is then detected based on the detection values.

When the first winding group 13a and the second winding group 13b have a phase difference of 30 degrees, the third-order component (3θ) of the induced voltage generated in the first winding group 13a and the third-order component (3(θ+30°)) of the induced voltage generated in the second winding group 13b have a phase difference of 90 degrees (3(θ+30°)−3θ=90°). Here, the rotation angle (a value that is three times the rotation angle θ) can be calculated by the ratio of the third-order component of the induced voltage generated in the first winding group 13a and the third-order component of the induced voltage generated in the second winding group 13b being calculated, and the arctangent of the ratio resulting from the calculation being calculated. In this way, in the configuration according to the present embodiment, unlike that in a conventional configuration in which the rotation angle θ is acquired every 60 degrees (Japanese Patent Publication No. 3424307), the rotation angle θ can be acquired as a continuous value. As a result of the rotation angle θ being acquired as a continuous value, error that occurs due to a sudden change in load on the motor 10 can be suppressed. Decrease in power efficiency and worsening of vibration noise can be suppressed.

Second Embodiment

Figure 6:
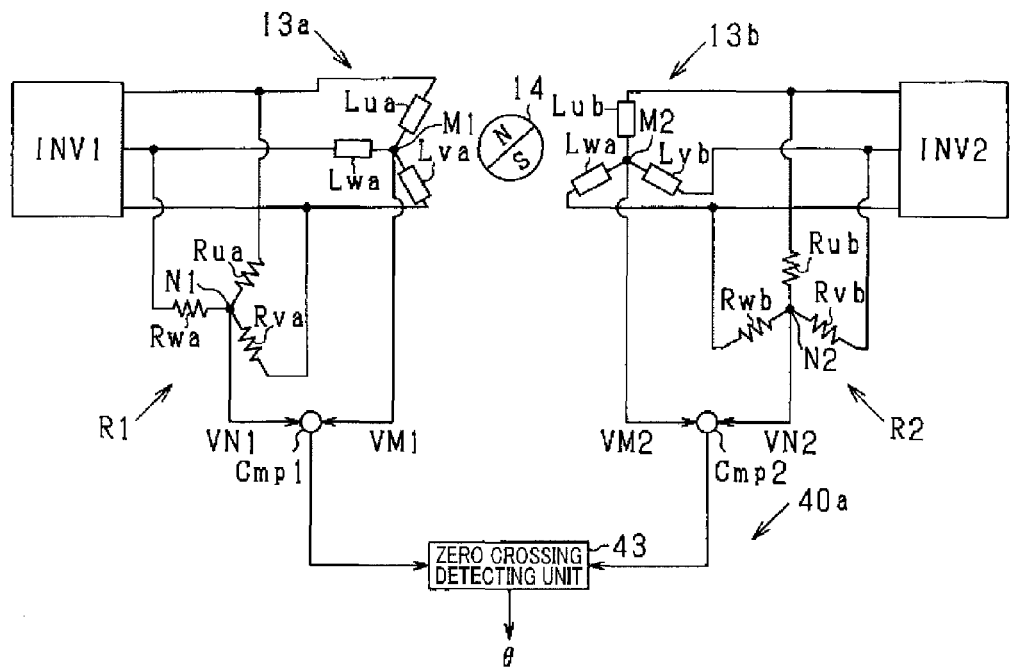
FIG. 6 is a model drawing of a method for acquiring a rotation angle according to a second embodiment.

FIG. 6 shows a model diagram of a method by which a control apparatus 40a according to a second embodiment acquires the rotation angle θ. An electrical configuration according to the second embodiment is the same as that according to the first embodiment shown in FIG. 1. The control apparatus 40a working as rotation angle detecting means according to the present embodiment detects the rotation angle θ at a zero crossing of the respective voltage differences ΔV1 and ΔV2.

Specifically, the configuration according to the present embodiment includes a comparator Cmp1 to which the neutral point voltage VM1 of the first winding group 13a and the neutral point voltage VN1 of the first resistor circuit R1 are inputted. When the neutral point voltage VM1 is higher than the neutral point voltage VN1, the comparator CMP1 outputs a high-level signal. When the neutral point voltage VM1 is lower than the neutral point voltage VN1, the comparator CMP1 outputs a low-level signal.

In addition, the configuration according to the present embodiment includes a comparator Cmp2 to which the neutral point voltage VM2 of the second winding group 13b and the neutral point voltage VN2 of the second resistor circuit R2 are inputted. When the neutral point voltage VN2 is higher than the neutral point voltage VM2, the comparator CMP2 outputs a high-level signal. When the neutral point voltage VN2 is lower than the neutral point voltage VM2, the comparator CMP2 outputs a low-level signal.

A zero crossing detecting unit 43 of the control apparatus 40a acquires the times at a zero crossing of the respective voltage differences ΔV1 and ΔV2, based on the output signals from the comparators Cmp1 and Cmp2. That is, the zero crossing detecting unit 43 acquires angles based on the timings at which the output signals from the comparators Cmp1 and Cmp2 change from high to low and from low to high.

Figure 7:
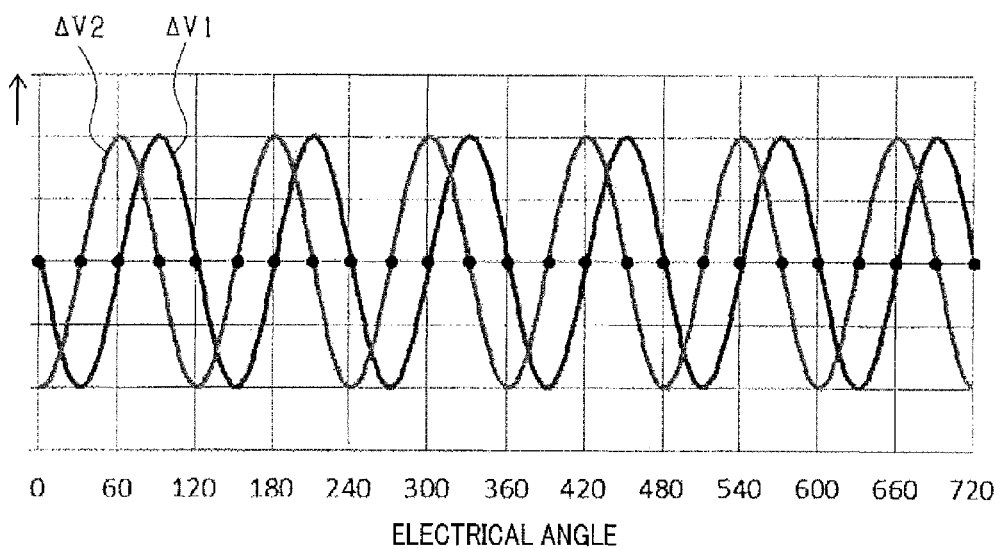
FIG. 7 is a diagram of voltage differences $\Delta V1$ and $\Delta V2$ between actual neutral point voltages and virtual neutral point voltages, in a first winding group and a second winding group.
Figure 8:
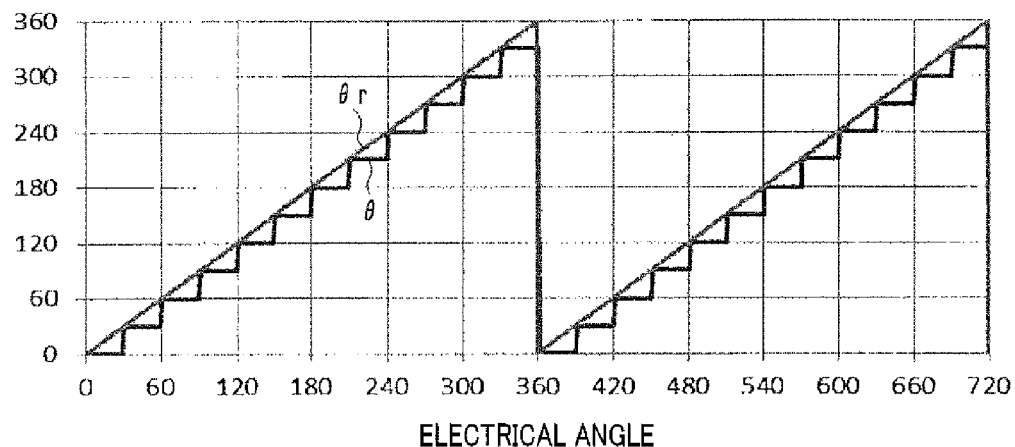
FIG. 8 is a diagram of a correspondence between actual values and detected values of the rotation angle according to the second embodiment.

As shown in FIG. 7, the voltage difference ΔV1 and the voltage difference ΔV2 have a phase difference of 90 degrees and a zero crossing at every interval of 60 degrees. That is, either of the voltage difference ΔV1 and the voltage difference ΔV2 has a zero crossing at every interval of 30 degrees. Here, as shown in FIG. 8, the control apparatus 40a increases the value of the rotation angle θ by 30 degrees every time the level of the output signals from the comparators Cmp1 and Cmp2 changes, thereby updating the value of the rotation angle θ.

The third-order component of the induced voltage of each phase has a zero crossing twice during a single cycle that is an electrical angle of 120 degrees. That is, the rotation angle θ can be detected as a discrete value at every interval of 60 degrees, based on a zero crossing timing of the third-order component of the induced voltage. Here, the third-order component of the induced voltage generated in the first winding group 13a and the third-order component of the induced voltage generated in the second winding group 13b have a phase difference of 90 degrees. Therefore, detection of the rotation angle θ at 0 degrees, 60 degrees, 120 degrees, 180 degrees, 240 degrees, and 300 degrees is possible based on the third-order component of the induced voltage generated in the first winding group 13a. Detection of the rotation angle θ at 30 degrees, 90 degrees, 150 degrees, 210 degrees, 270 degrees, and 330 degrees is possible based on the third-order component of the induced voltage generated in the second winding group 13b. That is, the rotation angle θ can be detected every 30 degrees.

Third Embodiment

Figure 9:
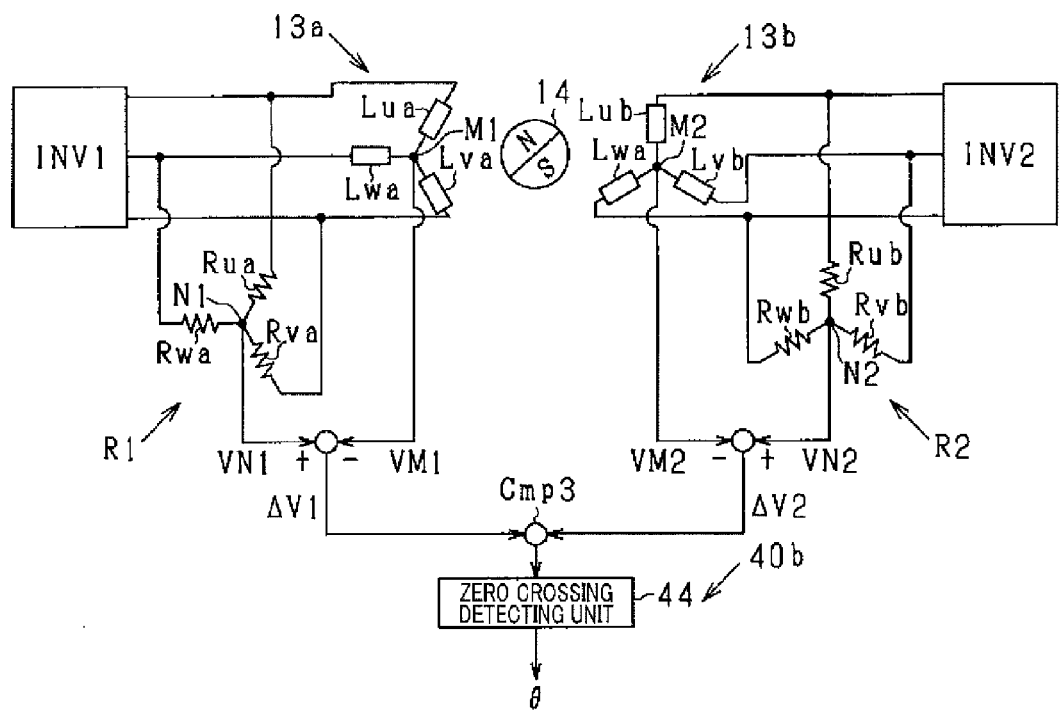
FIG. 9 is a model drawing of a method for acquiring a rotation angle according to a third embodiment.

FIG. 9 shows a model diagram of a method by which a control apparatus 40b according to a third embodiment acquires the rotation angle θ. An electrical configuration according to the third embodiment is the same as that according to the first embodiment shown in FIG. 1. The control apparatus 40b working as rotation angle detecting means according to the present embodiment detects the rotation angle θ at a zero crossing of a difference between the voltage differences ΔV1 and ΔV2.

Specifically, the configuration according to the present embodiment includes a comparator Cmp3 to which the voltage difference ΔV1 and the voltage difference ΔV2 are respectively inputted. When the voltage difference ΔV1 is greater than the voltage difference ΔV2, the comparator Cmp3 outputs a high-level signal. When the voltage difference ΔV1 is less than the voltage difference ΔV2, the comparator Cmp3 outputs a low-level signal.

A zero crossing detecting unit 44 of the control apparatus 40b acquires the times at a zero crossing of the difference between the voltage differences ΔV1 and ΔV2, based on the output signal from the comparator Cmp3. That is, the zero crossing detecting unit 44 acquires angles based on the timings at which a level of the output signal from the comparator Cmp3 changes from high to low and from low to high.

Figure 10:
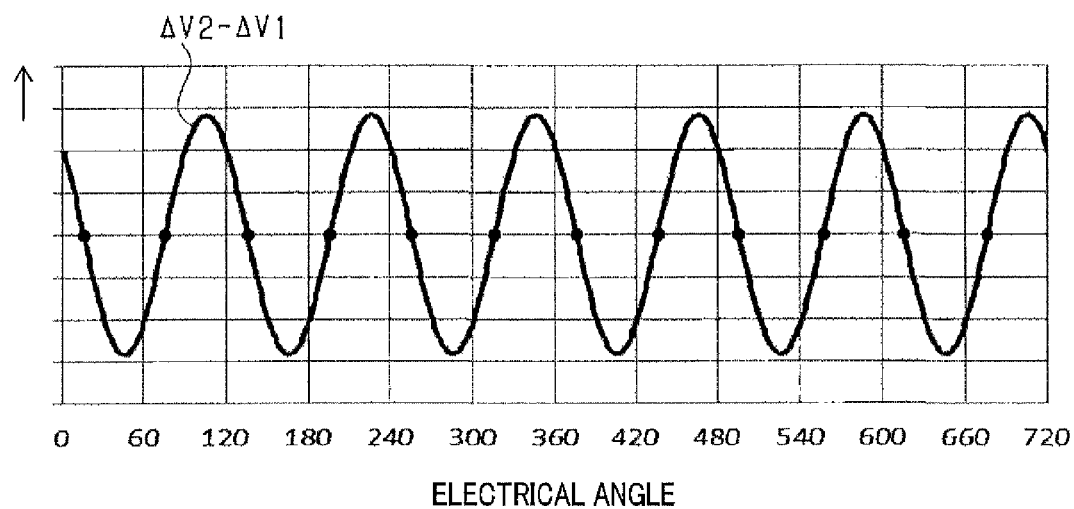
FIG. 10 is a diagram of a voltage difference between a voltage difference $\Delta V1$ and a voltage difference $\Delta V2$.
Figure 11:
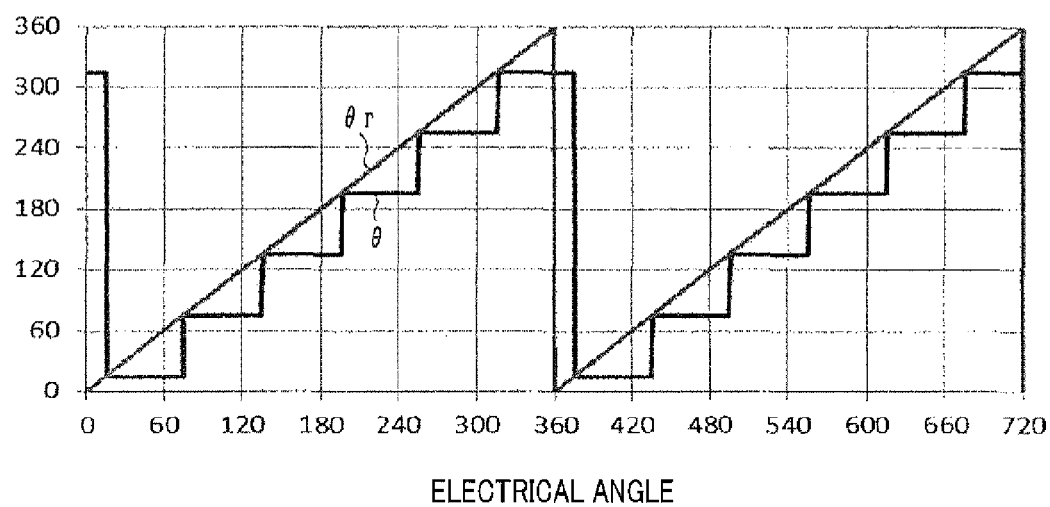
FIG. 11 is a diagram of a correspondence between actual values and detected values of the rotation angle according to the third embodiment.

As shown in FIG. 10, the difference between the voltage differences ΔV1 and ΔV2 has a zero crossing at every interval of 60 degrees. Here, as shown in FIG. 11, the control apparatus 40b increases the value of the rotation angle θ by 60 degrees every time the level of the output signal from the comparator Cmp3 changes, thereby updating the value of the rotation angle θ.

In the configuration according to the present embodiment, the effects of an offset error occurring between the third-order component of the induced voltage generated in the first winding group 13a and the third-order component of the induced voltage generated in the second winding group 13b can be canceled. Detection accuracy of the rotation angle θ can be improved. In addition, compared to the configuration according to the second embodiment, the number of comparators can be reduced. The number of components used in the apparatus can be reduced.

Fourth Embodiment

Figure 12:
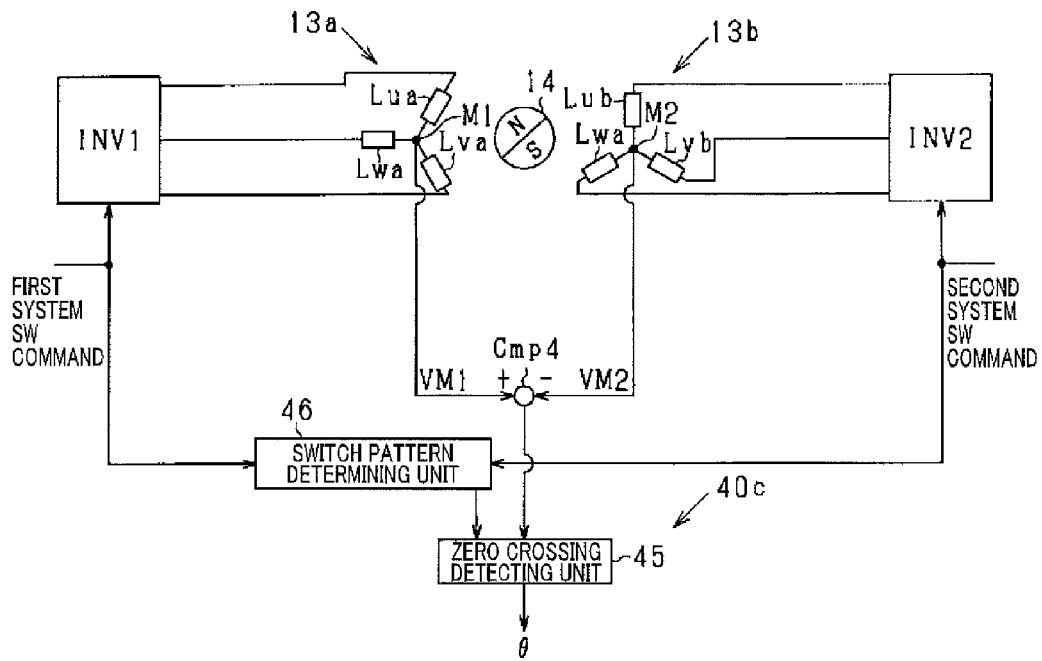
FIG. 12 is a model drawing of a method for acquiring a rotation angle according to a fourth embodiment.

FIG. 12 shows a model diagram of a method by which a control apparatus 40c according to a fourth embodiment acquires the rotation angle θ. An electrical configuration according to the fourth embodiment is the same as that according to the first embodiment shown in FIG. 1. The control apparatus 40c working as rotation angle detecting means according to the present embodiment detects the rotation angle θ based on a difference (VM1−VM2) between the voltage VM1 at the actual neutral point M1 of the first winding group 13a and the voltage VM2 at the actual neutral point M2 of the second winding group 13b.

Specifically, the configuration according to the present embodiment includes a comparator Cmp4 to which the voltage VM1 and the voltage VM2 are inputted. When the voltage VM1 is higher than the voltage VM2, the comparator Cmp4 outputs a high-level signal. When the voltage VM1 is lower than the voltage VM2, the comparator Cmp4 outputs a low-level signal.

A zero crossing detecting unit 45 of the control apparatus 40c acquires the times at a zero crossing of the difference between the voltages VM1 and VM2, based on the output signal from the comparator Cmp4. The zero crossing detecting unit 45 acquires angles based on the timings at which the output signal from the comparator Cmp4 changes from high to low and from low to high.

Figure 13:
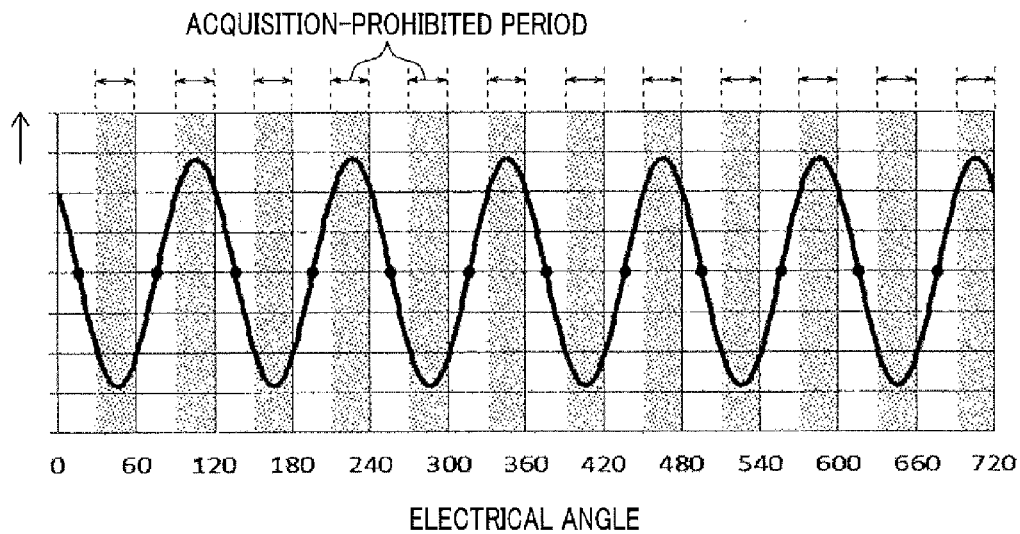
FIG. 13 is a diagram of a voltage difference between an actual neutral point voltage VM1 of a first winding group and an actual neutral point voltage VM2 of a second winding group.

As shown in FIG. 13, the difference between the voltages VM1 and VM2 has a zero crossing at every interval of 60 degrees. Here, in a manner similar to that in FIG. 11, the control apparatus 40c increases the value of the rotation angle θ by 60 degrees every time the level of the output signal from the comparator Cmp3 changes, thereby updating the value of the rotation angle θ.

In addition, a phase difference of 30 degrees is present between the first winding group 13a and the second winding group 13b. Therefore, a phase difference of 30 degrees is also present between the output voltage of the inverter INV1 that applies a voltage to the first winding group 13a and the output voltage of the inverter INV2 that applies a voltage to the second winding group 13b. Here, switching is performed between a drive pattern of a switch SW in the inverter INV1 and a drive pattern of a switch SW in the inverter INV2 each time the respective rotation angles θ change by 60 degrees. That is, the drive patterns of the switches SW of the inverters INV1 and INV2 match during half of a period over which the rotation angle θ changes by 60 degrees. The drive patterns of the switches SW of the inverters INV1 and INV2 differ during the remaining half of the period.

Therefore, as shown in FIG. 13, a switch pattern determining unit 46 of the control apparatus 40c determines whether or not the drive patterns of the switches SW of the inverters INV1 and INV2 match, and the voltage applied to the first winding group 13a and the voltage applied to the second winding group 13a are equal. Then, the zero crossing detecting unit 45 detects the rotation angle θ under a condition that the switch pattern determining unit 46 has determined that the switch patterns match. In other words, the control apparatus 40c prohibits detection of the rotation angle θ under a condition that the drive patterns of the switches SW of the inverters INV1 and INV2 differ, and the voltage applied to the first winding group 13a and the voltage applied to the second winding group 13b differ.

Effects according to the present embodiment will be described below.

In the configuration according to the present embodiment, unlike in the configurations according to the first to third embodiments and the configurations of prior art, the resistor circuits can be omitted. Increase in the physical size of the apparatus can be suppressed.

A phase difference of 30 degrees is present between the first winding group 13a and the second winding group 13b. Therefore, a phase difference of 30 degrees is also present between the voltages applied to the first winding group 13a and the second winding group 13b. That is, when voltage vector control is performed, a period over which the voltage applied to the first winding group 13a and the voltage applied to the second winding group 13b match, and a period over which the voltage applied to the first winding group 13a and the voltage applied to the second winding group 13b do not match are repeated at a 30-degree interval. Here, as a result of a configuration in which the rotation angle is detected based on the induced voltage during the period over which the applied voltages match, deterioration in the detection accuracy of the rotation angle θ can be suppressed.

Fifth Embodiment

Figure 14:
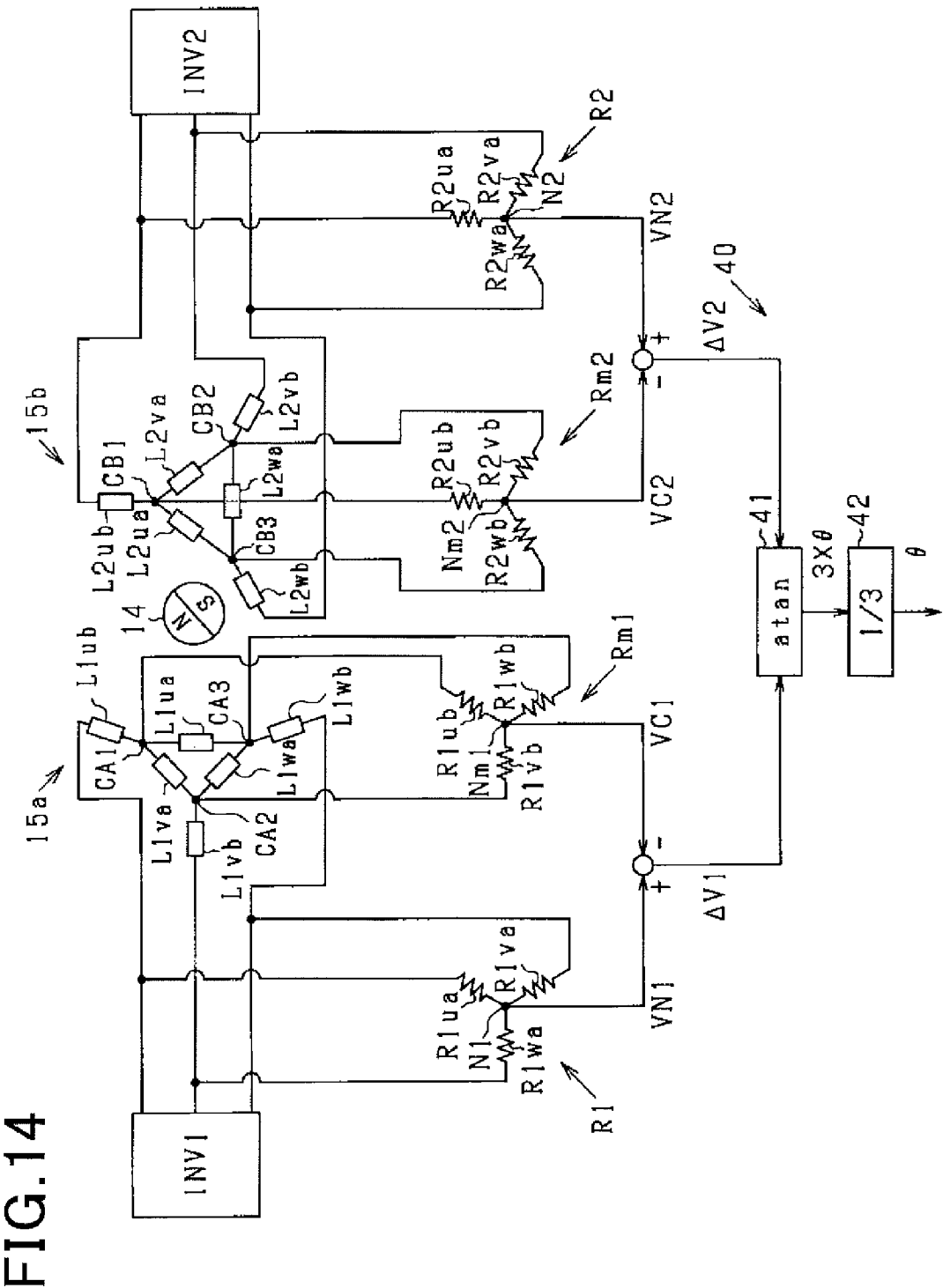
FIG. 14 is model drawing of a method for acquiring a rotation angle according to a fifth embodiment.

FIG. 14 shows a model diagram of a method by which the control apparatus 40 according to a fifth embodiment acquires the rotation angle θ.

According to the present embodiment, a first winding group 15a and a second winding group 15b have delta-star connections. In addition, according to the present embodiment, the first winding group 15a and the second winding group 15b have a phase difference of 30 degrees.

The first winding group 15a includes first U-, V-, and W-phase delta-portion coils L1ua, L1va, and L1wa that are connected by a delta connection. The first winding group 15a also includes first U-, V-, and W-phase connecting coils L1ub, L1vb, and L1wb.

A first end of the first U-phase connecting coil L1ub is connected to a connection point between the first U-phase delta-portion coil L1ua and the first V-phase delta-portion coil L1va. Therefore, the first U-phase delta-portion coil L1ua, the first V-phase delta-portion coil L1va, and the first U-phase connecting coil L1ub are connected by a star connection at a first actual neutral point CA1 of the first winding group 15a. A connection point between the first U-phase, high-voltage side switch SUp1 and the first U-phase, low-voltage side switch SUn1 is connected to a second end of the first U-phase connecting coil L1ub.

A first end of the first V-phase connecting coil L1vb is connected to a connection point between the first V-phase delta-portion coil L1va and the first W-phase delta-portion coil L1wa. Therefore, the first V-phase delta-portion coil L1va, the first W-phase delta-portion coil L1wa, and the first V-phase connecting coil L1vb are connected by a star connection at a second actual neutral point CA2 of the first winding group 15a. A connection point between the first V-phase, high-voltage side switch SVp1 and the first V-phase, low-voltage side switch SVn1 is connected to a second end of the first V-phase connecting coil L1vb.

A first end of the first W-phase connecting coil L1wb is connected to a connection point between the first U-phase delta-portion coil L1ua and the first W-phase delta-portion coil L1wa. Therefore, the first U-phase delta-portion coil L1ua, the first W-phase delta-portion coil L1wa, and the first W-phase connecting coil L1wb are connected by a star connection at a third actual neutral point CA3 of the first winding group 15a. A connection point between the first W-phase, high-voltage side switch SWp1 and the first W-phase, low-voltage side switch SWn1 is connected to a second end of the first W-phase connecting coil L1wb.

Meanwhile, the second winding group 15b includes second U-, V-, and W-phase delta-portion coils L2ua, L2va, and L2wa. The second winding group 15b also includes second U-, V-, and W-phase connecting coils L2ub, L2vb, and L2wb.

A first end of the second U-phase connecting coil L2ub is connected to a connection point between the second U-phase delta-portion coil L2ua and the second V-phase delta-portion coil L2va. Therefore, the second U-phase delta-portion coil L2ua, the second V-phase delta-portion coil L2va, and the second U-phase connecting coil L2ub are connected by a star connection at a first actual neutral point CB 1 of the second winding group 15b. A connection point between the second U-phase, high-voltage side switch SUp2 and the second U-phase, low-voltage side switch SUn2 is connected to a second end of the second U-phase connecting coil L2ub.

A first end of the second V-phase connecting coil L2vb is connected to a connection point between the second V-phase delta-portion coil L2va and the second W-phase delta-portion coil L2wa. Therefore, the second V-phase delta-portion coil L2va, the second W-phase delta-portion coil L2wa, and the second V-phase connecting coil L2vb are connected by a star connection at a second actual neutral point CB2 of the second winding group 15b. A connection point between the second V-phase, high-voltage side switch SVp2 and the second V-phase, low-voltage side switch SVn2 is connected to a second end of the second V-phase connecting coil L2vb.

A first end of the second W-phase connecting coil L2wb is connected to a connection point between the second U-phase delta-portion coil L2ua and the second W-phase delta-portion coil L2wa. Therefore, the second U-phase delta-portion coil L2ua, the second W-phase delta-portion coil L2wa, and the second W-phase connecting coil L2wb are connected by a star connection at a third actual neutral point CB3 of the second winding group 15b. A connection point between the second W-phase, high-voltage side switch SWp2 and the second W-phase, low-voltage side switch SWn2 is connected to a second end of the second W-phase connecting coil L2wb.

According to the present embodiment, the number of turns of each of the delta-portion coils L1ua, L1va, and L1wa configuring the first winding group 15a and the number of turns of each of the delta-portion coils L2ua, L2va, and L2wa configuring the second winding group 15b are set to be equal.

According to the present embodiment, reference numbers of the resistors configuring the first resistor circuit R1 are R1ua, R1va, and R1wa. In addition, reference numbers of the resistors configuring the second resistor circuit R2 are R2ua, R2va, and R2wa.

According to the present embodiment, a first motor resistor circuit Rm1 is provided in correspondence to the first winding group 15a. The first motor resistor circuit Rm1 includes first U-, V-, and W-phase resistors R1ub, R1vb, and R1wb that have a three-phase star connection. Specifically, first ends of the first U-, V-, and W-phase resistors R1ub, R1vb, and R1wb are connected at a first motor neutral point Nm1 that serves as a virtual neutral point. The first, second, and third neutral points CA1, CA2, and CA3 are respectively connected to second ends of the first U-, V-, and W-phase resistors R1ub, R1vb, and R1wb.

According to the present embodiment, a second motor resistor circuit Rm2 is provided in correspondence to the second winding group 15b. The second motor resistor circuit Rm2 includes second U-, V-, and W-phase resistors R2ub, R2vb, and R2wb that have a three-phase star connection. Specifically, first ends of the second U-, V-, and W-phase resistors R2ub, R2vb, and R2wb are connected at a second motor neutral point Nm2 that serves as a virtual neutral point. The first, second, and third neutral points CB1, CB2, and CB3 are respectively connected to second ends of the second U-, V-, and W-phase resistors R2ub, R2vb, and R2wb.

Here, voltages at the second end of the first U-, V-, and W-phase connecting coils L1ub, L1vb, and L1wb are respectively VU1, VV1, and VW1. In addition, induction voltages of the first U-, V-, and W-phase delta-portion coils L1ua, L1va, and L1wa are respectively EUT1, EVT1, and EWT1. Induction voltages of the first U-, V-, and W-phase connecting coils L1ub, L1vb, and L1wb are respectively EUP1, EVP1, and EWP1. According to the present embodiment, the induction voltages EUT1, EVT1, and EWT1 of the first U-, V-, and W-phase delta-portion coils L1ua, L1va, and L1wa and the induction voltages EUP1, EVP1, and EWP1 of the first U-, V-, and W-phase connecting coils L1ub, L1vb, and L1wb are respectively expressed by: EUT1=α× EU1; EVT1=α×EV1; EWT1=α×EW1; EUP1=(1−α)×EU1; EVP1=(1−α)×EV1; and EWP1=(1−α)×EW1.

The voltages EU1, EV1, and EW1 are induced voltages having a substantially trapezoidal waveform. Induction voltages based on the induction voltages generated in the first U-, V-, and W-phase delta-portion coils L1ua, L1va, and L1wa are generated in the first U-, V-, and W-phase connecting coils L1ub, L1vb, and L1wb. Here, the coefficient α is expressed in the following manner, using a number of turns Ntm of the delta-portion coil and a number of turns Nts of the connecting coil.

$$\alpha = Nts/(Ntm+Nts)$$

In addition, potential differences of the first U-, V-, and W-phase resistors R1ub, R1vb, and R1wb are respectively Vua, Vva, and Vwa. Here, a voltage VC1 at the first motor neutral point Nm1 and the voltage VN1 at the virtual neutral point N1 of the first resistor circuit R1 are respectively expressed by VC1=(⅓) [VU1−Vua−(1−α) EU1+ VV1=Vva−(1−α) EV1+VW1=Vwa−(1−α) EW1] and VN1=(⅓) (VU1+VV1+VW1).

In the above-described voltage VC1, VU1−Vua−(1−α) EU1 of the U phase, for example, indicates the potential difference from the first motor neutral point Nm1 to the second end of the first U-phase connecting coil L1ub, via the first U-phase resistor R1ub and the first actual neutral point CA1.

The potential difference between the voltage VC1 at the first motor neutral point Nm1 and the voltage VN1 at the virtual neutral point N1 of the first resistor circuit R1 is expressed by $\Delta V1=VN1-VC1=(\frac{1}{3})\ (1-\alpha)\times[(EU1+EV1+EW1)+(Vua+Vva+Vwa)]=(\frac{1}{3})\ (1-\alpha)\ (EU1+EV1+EW1)$. Here, the relationship Vua+Vva+Vwa=0 is used.

In a similar manner, voltages at the second end of the second U-, V-, and W-phase connecting coils L2ub, L2vb, and L2wb are respectively VU2, VV2, and VW2. In addition, induction voltages of the second U-, V-, and W-phase delta-portion coils L2ua, L2va, and L2wa are respectively EUT2, EVT2, and EWT2. Induction voltages of the second U-, V-, and W-phase connecting coils L2ub, L2vb, and L2wb are respectively EUP2, EVP2, and EWP2. According to the present embodiment, the induction voltages EUT2, EVT2, and EWT2 of the second U-, V-, and W-phase delta-portion coils L2ua, L2va, and L2wa and the induction voltages EUP2, EVP2, and EWP2 of the second U-, V-, and W-phase connecting coils L2ub, L2vb, and L2wb are expressed by: $EUT2=\alpha\times EU2$; $EVT2=\alpha\times EV2$; $EWT2=\alpha\times EW2$; $EUP2=(1-\alpha)\times EU2$; $EVP2=(1-\alpha)\times EV2$; and $EWP2=(1-\alpha)\times EW2$.

The voltages EU2, EV2, and EW2 are induced voltages having a substantially trapezoidal waveform. Induction voltages based on the induction voltages generated in the second U-, V-, and W-phase delta-portion coils L2ua, L2va, and L2wa are generated in the second U-, V-, and W-phase connecting coils L2ub, L2vb, and L2wb.

In addition, potential differences of the second U-, V-, and W-phase resistors R2ub, R2vb, and R2wb are respectively Vub, Vvb, and Vwb. Here, a voltage VC2 at the second motor neutral point Nm2 and the voltage VN2 at the virtual neutral point N2 of the second resistor circuit R2 are respectively expressed by $VC2=(\frac{1}{3})\ [VU2-Vub-(1-\alpha)\ EU2+VV2=Vvb-(1-\alpha)\ EV2+VW2=Vwb-(1-\alpha)\ EW2]$ and $VN2=(\frac{1}{3})\ (VU2+VV2+VW2)$.

Therefore, the potential difference between the voltage VC2 at the second motor neutral point Nm2 and the voltage VN2 at the virtual neutral point N2 of the second resistor circuit R2 is expressed by $\Delta V2=VN2-VC2=(\frac{1}{3})\ (1-\alpha)\times[(EU2+EV2+EW2)+(Vub+Vvb+Vwb)]=(\frac{1}{3})\ (1-\alpha)\ (EU2+EV2+EW2)$. Here, the relationship Vub+Vvb+Vwb=0 is used.

Here, the sum of the induction voltages EU1, EV1, and EW1 for the voltage difference $\Delta V1$ becomes zero except for 3n-th order component in which an equilibrium relationship of the three phases is maintained. Therefore, in a manner similar to that according to the above-described first embodiment, the third order component of the induced voltages EU1, EV1, and EW1 are mainly outputted as the voltage difference $\Delta V1$. The voltage difference $\Delta V1$ is substantially a sine wave having three times the frequency of the induced voltages EU1, EV1, and EW1 that have substantially trapezoidal waveforms.

In a similar manner, the sum of the induction voltages EU2, EV2, and EW2 for the voltage difference $\Delta V2$ becomes zero except for 3n-th order components in which an equilibrium relationship of the three phases is maintained. Therefore, the third order component of the induced voltages EU2, EV2, and EW2 are mainly outputted as the voltage difference $\Delta V2$. The voltage difference $\Delta V2$ is substantially a sine wave having three times the frequency of the induced voltages EU2, EV2, and EW2 that have substantially trapezoidal waveforms.

Here, in a manner similar to that according to the above-described first embodiment, the induced voltages EU1, EV1, and EW1 of the first winding group 15a and the induced voltages EU2, EV2, and EW2 of the second winding group 15b have a voltage difference of 30 degrees. The voltage differences $\Delta V1$ and $\Delta V2$ each have a frequency that is three times that of a fundamental wave. Therefore, the voltage differences $\Delta V1$ and $\Delta V2$ are as shown in FIG. 4, described above.

As a result, when the voltage difference $\Delta V1$ is expressed as Amp×sin 3θ, in a manner similar to that according to the above-described first embodiment, the voltage difference $\Delta V2$ can be expressed as Amp×cos 3θ. Therefore, the ratio $\Delta V1/\Delta V2$ of the voltage difference $\Delta V1$ and the voltage difference $\Delta V2$ becomes tan 3θ. In a manner similar to that according to the above-described first embodiment, the rotation angle θ can be calculated based on the ratio $\Delta V1/\Delta V2$ of the voltage differences.

Sixth Embodiment

Figure 15:
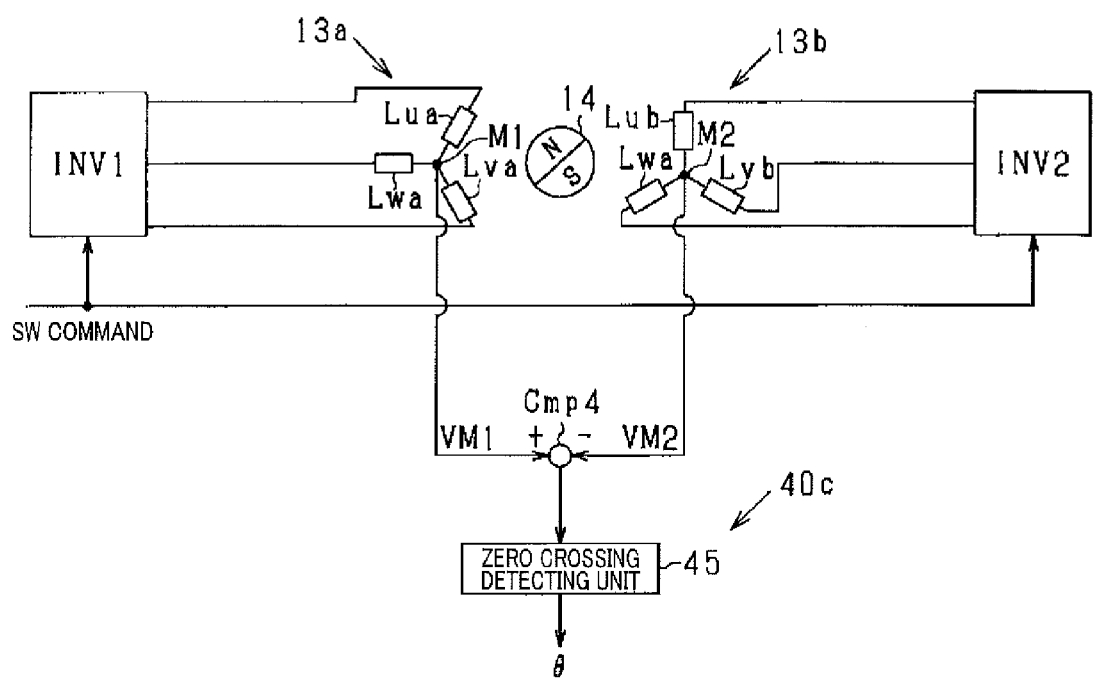
FIG. 15 is model drawing of a method for acquiring a rotation angle according to a sixth embodiment.

FIG. 15 shows a model diagram of a method by which the control apparatus 40c according to a sixth embodiment acquires the rotation angle θ.

According to the above-described fourth embodiment, the switches configuring the inverters INV1 and INV2 are controlled such that a phase difference of 30 degrees is present between the output voltage of the inverter INV1 that applies a voltage to the first winding group 13a and the output voltage of the inverter INV2 that applies a voltage to the second winding group 13b. According to the present embodiment, the switches configuring the inverters INV1 and INV2 are controlled such that the phase difference between the output voltage of the inverter INV1 and the output voltage of the inverter INV2 is zero. That is, the drive pattern of the switch configuring the inverter INV1 and the drive pattern of the switch configuring the inverter INV2 are the same. Various drive patterns can be used. Specifically, for example, a drive pattern that is prescribed based on a three-phase, 180-degree conduction system can be used. This drive pattern is such that, for each phase, the high-voltage side switch and the low-voltage side switch are alternately turned ON at every electrical angle of 180 degrees, and the OFF operation of the high-voltage side switch of each phase is shifted from each other by an electrical angle of 120 degrees.

According to the present embodiment, the drive patterns of the switches SW of the inverters INV1 and INV2 match at all times. The voltage applied to the first winding group 13a and the voltage applied to the second winding group 13b are equal at all times. Therefore, the restriction to the zero crossing detecting unit 45 that prohibits detection of the rotation angle θ, as shown in above-described FIG. 13, can be eliminated.

OTHER EMBODIMENTS

In FIG. 6 and FIG. 9, described above, the voltages VM1 and VM2 may be changed to the voltages VC1 and VC2 according to the above-described fifth embodiment.

According to the above-described fifth embodiment, a shift may occur between the phase of the induced voltage of the delta-portion coil and the phase of the induced voltage of the connecting coil. In this case as well, the rotation angle θ can be detected.

According to the first embodiment, the phase difference between the first winding group 13a and the second winding group 13b is 30 degrees. However, the phase difference may be modified such that the first winding group 13a and the second winding group 13b has a phase difference that is an odd-number multiple of 30 degrees. For example, the phase difference between the first winding group 13a and the second winding group 13b may be 90 degrees. In this case, the third-order component of the induced voltage generated in the first winding group 13a and the third-order component of the induced voltage generated in the second winding group 13b have a phase difference of 270 degrees. Therefore, when the arctangent of the ratio ΔV1/ΔV2 of the voltage differences is calculated, −3θ can be acquired.

According to the second embodiment, the phase difference between the first winding group 13a and the second winding group 13b is 30 degrees. However, the phase difference may be modified such that the first winding group 13a and the second winding group 13b has a phase difference that is an odd-number multiple of 30 degrees. For example, the phase difference between the first winding group 13a and the second winding group 13b may be 90 degrees. In this case, the third-order component of the induced voltage generated in the first winding group 13a and the third-order component of the induced voltage generated in the second winding group 13b have a phase difference of 270 degrees.

According to the above-described embodiments, the motor 10 is a permanent magnet synchronous motor. However, the motor 10 may be modified such as to be a wound-field synchronous motor in which the rotor is provided with a field winding.

Instead of the SPMSM in which the permanent magnet 14 is provided on the surface of the rotor 11, the motor 10 may be an interior permanent magnet synchronous motor (IPMSM) in which a permanent magnet is embedded inside the rotor.

A configuration is used in which a three-phase armature winding is provided. However, the configuration may be modified such that, for example, a five-phase armature winding is provided.

A configuration in which only two winding groups, that is, the first winding group 13a and the second winding group 13b are provided is used as the armature winding. However, the configuration may be modified. That is, the rotation angle detecting means may detect the rotation angle of a motor that includes three or more winding groups. The rotation angle detecting means may detect the rotation angle of the motor based on the actual neutral point voltages of two winding groups among the three or more winding groups.

What is claimed is:

1. A control apparatus for a rotating electric machine that is applied to a multilayer winding-type rotating electric machine,
    the multilayer winding-type rotating electric machine including:
        a stator that includes an armature winding, the armature winding having a plurality of winding groups, each of the plurality of winding groups having a plurality of coils that are connected to an actual neutral point provided for each winding group; and
        a rotor that includes at least one of a field winding and a permanent magnet for generating a magnetic field, the at least one of the field winding and the permanent magnet having characteristics of magnetic flux of a non-sinusoidal waveform in relation to a rotation angle of the rotor,
    each of the plurality of winding groups having a first winding group and a second winding group that have a phase difference,
    the control apparatus controlling the rotating electric machine based on the rotation angle, the control apparatus comprising
        rotation angle detecting means for detecting a rotation angle based on a voltage at the actual neutral point of the first winding group and a voltage at the actual neutral point of the second winding group.

2. The control apparatus according to claim 1, wherein:
    the armature winding is a three phase winding;
    the control apparatus further comprises
        a first resistor circuit that has a first virtual neutral point and a plurality of resistors that are connected to the first virtual neutral point, the first resistor circuit being connected in parallel to the first winding group, and
        a second resistor circuit that has a second virtual neutral point and a plurality of resistors that are connected to the second virtual neutral point, the second resistor circuit being connected to the second winding group;
    the rotation angle detecting means detects the rotation angle based on a first voltage difference and a second voltage difference,
        the first voltage difference being a difference between the voltage at the actual neutral point of the first winding group and the voltage at the virtual neutral point of the first resistor circuit, and
        the second voltage difference being a difference between the voltage at the actual neutral point of the second winding group and the voltage at the virtual neutral point of the second resistor circuit.

3. The control apparatus according to claim 2, wherein:
    the armature winding has, as the plurality of coils,
        three-phase delta-portion coils that are connected by a delta connection, and
        connecting coils that are connected to connection points between the delta-portion coils, and in which an induced voltage based on an induced voltage generated in the delta-portion coil is generated;
    a voltage at the actual neutral point of the first winding group is the voltage at the connection point between the delta-portion coil and the connecting coil configuring the first winding group; and
    a voltage at the actual neutral point of the second winding group is the voltage at the connection point between the delta-portion coil and the connecting coil configuring the second winding group.

4. The control apparatus according to claim 2, wherein:
    the first winding group and the second winding group have a phase difference that is an odd-number multiple of 30 degrees; and
    the rotation angle detecting means detects the rotation angle by calculating a ratio of the first voltage difference and the second voltage difference, and calculating an arctangent of the calculated ratio.

5. The control apparatus according to claim 2, wherein:
    the first winding group and the second winding group form an electrical angle that is an odd-number multiple of 30 degrees; and
    the rotation angle detecting means detects the rotation angle at a zero crossing of each of the first voltage difference and the second voltage difference.

6. The control apparatus according to claim 2, wherein:
the rotation angle detecting means calculates the rotation angle at a zero crossing of a difference between the first voltage difference and the second voltage difference.

7. The control apparatus according to claim 1, wherein:
the armature winding is a three-phase winding; and
the rotation angle detecting means detects a rotation angle of the rotating electric machine based on a difference between the voltage at the neutral point of the first winding group and the voltage at the neutral point of the second winding group.

8. The control apparatus according to claim 7, wherein:
the rotation angle detecting means detects the rotation angle of the rotating electric machine under a condition that a voltage applied to the first winding group and a voltage applied to the second winding group are equal.

9. The control apparatus according to claim 8, wherein:
the control apparatus controls inverters respectively connected to the first winding group and the second winding group such that the voltage applied to the first winding group and the voltage applied to the second winding group are equal.

10. The control apparatus according to claim 7, wherein:
the rotation angle detecting means detects the rotation angle at a zero crossing of a difference between the voltage at the actual neutral point of the first winding group and the voltage at the actual neutral point of the second winding group.

11. The control apparatus according to claim 3, wherein:
the first winding group and the second winding group have a phase difference that is an odd-number multiple of 30 degrees; and
the rotation angle detecting means detects the rotation angle by calculating a ratio of the first voltage difference and the second voltage difference, and calculating an arctangent of the calculated ratio.

12. The control apparatus according to claim 3, wherein:
the first winding group and the second winding group form an electrical angle that is an odd-number multiple of 30 degrees; and
the rotation angle detecting means detects the rotation angle at a zero crossing of each of the first voltage difference and the second voltage difference.

13. The control apparatus according to claim 3, wherein:
the rotation angle detecting means calculates the rotation angle at a zero crossing of a difference between the first voltage difference and the second voltage difference.

14. The control apparatus according to claim 8, wherein:
the rotation angle detecting means detects the rotation angle at a zero crossing of a difference between the voltage at the actual neutral point of the first winding group and the voltage at the actual neutral point of the second winding group.

15. The control apparatus according to claim 9, wherein:
the rotation angle detecting means detects the rotation angle at a zero crossing of a difference between the voltage at the actual neutral point of the first winding group and the voltage at the actual neutral point of the second winding group.

16. A rotating electric machine that is applied to a multilayer winding-type rotating electric machine, the rotating electric machine comprising:
a stator that is provided with an armature winding, the armature winding having a plurality of winding groups, each of the plurality of winding groups having a plurality of coils that are connected to an actual neutral point provided for each winding group, each of the plurality of winding groups having a first winding group and a second winding group that have a phase difference;
a rotor that has at least one of a field winding and a permanent magnet for generating a magnetic field, the at least one of the field winding and the permanent magnet having characteristics of magnetic flux of a non-sinusoidal waveform in relation to a rotation angle of the rotor; and
a control apparatus that controls a rotating electric machine based on the rotation angle, the control apparatus comprising rotation angle detecting means for detecting the rotation angle based on a voltage at the actual neutral point of the first winding group and a voltage at the actual neutral point of the second winding group.

17. A control method for a rotating electric machine that is applied to a multilayer winding-type rotating electric machine,
the multilayer winding-type rotating electric machine comprising:
a stator that includes an armature winding, the armature winding having a plurality of winding groups, each of the plurality of winding groups having a plurality of coils that are connected to an actual neutral point provided for each winding group, each of the plurality of winding groups having a first winding group and a second winding group that have a phase difference; and
a rotor that includes at least one of a field winding and a permanent magnet for generating a magnetic field, the at least one of the field winding and the permanent magnet having characteristics of magnetic flux of a non-sinusoidal waveform in relation to a rotation angle of the rotor,
the control method comprising:
detecting a rotation angle based on a voltage at the actual neutral point of the first winding group and a voltage at the actual neutral point of the second winding group; and
controlling the rotating electric machine based on the rotation angle.

* * * * *